United States Patent
Wang

(10) Patent No.: US 8,725,497 B2
(45) Date of Patent: May 13, 2014

(54) SYSTEM AND METHOD FOR DETECTING AND CORRECTING MISMATCHED CHINESE CHARACTER

(76) Inventor: Daniel M. Wang, Morganville, NJ (US)

( * ) Notice: Subject to any disclaimer, the term of this patent is extended or adjusted under 35 U.S.C. 154(b) by 348 days.

(21) Appl. No.: 13/253,662

(22) Filed: Oct. 5, 2011

(65) Prior Publication Data

US 2013/0090916 A1   Apr. 11, 2013

(51) Int. Cl.
*G06F 17/28* (2006.01)
*G06F 17/27* (2006.01)
*G06F 17/21* (2006.01)
*G10L 15/04* (2013.01)
*G10L 21/00* (2013.01)

(52) U.S. Cl.
USPC .......... 704/9; 704/3; 704/4; 704/10; 704/251; 704/270; 704/275

(58) Field of Classification Search
USPC ................ 704/3, 4, 9, 10, 251, 270, 275
See application file for complete search history.

(56) References Cited

U.S. PATENT DOCUMENTS

| | | | | |
|---|---|---|---|---|
| 5,119,296 A * | 6/1992 | Zheng et al. | | 715/263 |
| 5,175,803 A * | 12/1992 | Yeh | | 715/234 |
| 5,477,448 A * | 12/1995 | Golding et al. | | 704/9 |
| 5,586,198 A * | 12/1996 | Lakritz | | 382/185 |
| 5,835,924 A * | 11/1998 | Maruyama et al. | | 715/264 |
| 5,903,861 A * | 5/1999 | Chan | | 704/9 |
| 6,014,615 A * | 1/2000 | Chen | | 704/3 |
| 6,047,300 A * | 4/2000 | Walfish et al. | | 715/257 |
| 6,292,768 B1 * | 9/2001 | Chan | | 704/1 |
| 6,401,060 B1 * | 6/2002 | Critchlow et al. | | 704/1 |
| 6,587,819 B1 * | 7/2003 | Lu | | 704/257 |
| 6,848,080 B1 * | 1/2005 | Lee et al. | | 715/203 |
| 7,107,204 B1 * | 9/2006 | Liu et al. | | 704/2 |
| 7,395,203 B2 * | 7/2008 | Wu et al. | | 704/235 |
| 8,201,087 B2 * | 6/2012 | Kay et al. | | 715/257 |
| 8,225,203 B2 * | 7/2012 | Unruh | | 715/255 |
| 8,249,873 B2 * | 8/2012 | Blair et al. | | 704/252 |
| 2005/0027534 A1 * | 2/2005 | Meurs et al. | | 704/270 |
| 2006/0048055 A1 * | 3/2006 | Wu et al. | | 715/535 |

(Continued)

OTHER PUBLICATIONS

Hsu, Bo-Jun. Paul, and James Glass. "Spoken correction for chinese text entry." Chinese Spoken Language Processing. Springer Berlin Heidelberg, 2006. 648-659.*

(Continued)

*Primary Examiner* — Edgar Guerra-Erazo
(74) *Attorney, Agent, or Firm* — Wang Law Firm, Inc.; Li K. Wang; Stephen Hsu

(57) ABSTRACT

A system and method for detecting and correcting mismatched Chinese characters in a phrase. The system comprises a database for the look-up of characters and Chinese phrases, a module to compare the input phrases with the look-up data retrieved from the database and a module to correct the mismatched characters. The database contains correct phrases as well as attributes associated with each character, such as pronunciation and radical composition. The modules inputs a Chinese phrase that has at least two characters and compares it with the data retrieved from the database to determine if there are incorrect characters. The spell checking method includes two groups of steps: mismatched character detection and mismatched character correction. Whether there is any mismatched character to be corrected is determined by the edit distance, the phrase length and comparisons of the pronunciation and radical composition of the mismatched characters.

6 Claims, 3 Drawing Sheets

(56) References Cited

U.S. PATENT DOCUMENTS

| | | | |
|---|---|---|---|
| 2006/0256088 A1* | 11/2006 | Kong | 345/168 |
| 2008/0028303 A1* | 1/2008 | Wu et al. | 715/262 |
| 2008/0077396 A1* | 3/2008 | Hsu | 704/10 |
| 2008/0077588 A1* | 3/2008 | Zhang et al. | 707/6 |
| 2008/0187891 A1* | 8/2008 | Yang | 434/156 |
| 2009/0083028 A1* | 3/2009 | Davtchev et al. | 704/9 |
| 2009/0226098 A1* | 9/2009 | Takahashi et al. | 382/218 |
| 2011/0015920 A1* | 1/2011 | How | 704/8 |
| 2011/0022952 A1* | 1/2011 | Wu et al. | 715/257 |
| 2013/0185053 A1* | 7/2013 | Hsu | 704/8 |

OTHER PUBLICATIONS

Microsoft Corp., "Microsoft Pinyin IME," 46 pages; Copyright 2003.*

Bin, Y. E., Kawakami, H., & Matsumoto, T. (2000). A Roman-Chinese Character Conversion System Correcting Pinyin Spell Errors with Application to the Chinese FEP. IEICE Transactions on Information and Systems, 83(5), 1153-1159.*

* cited by examiner

SYSTEM AND METHOD FOR DETECTING AND CORRECTING MISMATCHED CHINESE CHARACTER

FIELD OF THE INVENTION

The present invention generally relates to process the Chinese language and, in particular, to a system and a method to process and correct spelling errors in Chinese phrases. It detects mismatched characters in a Chinese phrase and then compares the pronunciation and radical compositions of mismatched characters in a phrase with those of characters in a correct phrase or phrases stored in the database.

BACKGROUND OF THE INVENTION

Unlike English, where a word is composed of one or more than one of 26 alphabetical letters, a word in Chinese may be composed of one or more than one Chinese character. There are debates on what constitutes a Chinese word. The complexity of the word definition in Chinese is further compounded by the lack of grammatical elements to segment a sentence into multiple words. In Chinese, there are no 'space characters' to delimit a word. A user sometimes must read the entire sentence to understand the meaning and be able to determine what words are used to compose a sentence.

In the absence of a clear definition of a word and in order to avoid confusion, we have adopted the term 'phrase' to refer to any written series of two or more Chinese characters that is no more than a sentence in length. The present invention is not concerned with single Chinese characters because it is impossible to decide if they are misspelled.

The Chinese spelling problem refers to misspelled characters in a Chinese phrase. In Roman languages, spelling refers to the writing of words with alphabetic letters, while misspelling refers to mistakes in the choice or placement of letters. In non-Roman, character-based languages, such as Chinese, there can be mismatched characters, i.e. one or more of the characters making up a word/phrase can be incorrect. But technically no misspelling because Chinese words/phrases are made up of characters not alphabetic letters. In the interest of communicating the fact that there is an error in a Chinese phrase, we will use misspell and mismatch interchangeably throughout the document.

Besides meaning, every Chinese character is associated with the following attributes:

(A) Radicals: A Chinese character typically is composed of radicals. For instance, the Chinese character '好' (good) is composed of two radicals: '女' (girl), the root radical, and '子' (child), sometimes called the right radical, or a non-root radical. The position (top, bottom, left or right) of the root-radical and non-root radical in a character is non-deterministic, although most of the root-radicals are on the left side in a character. There are 214 root-radicals defined in the Chinese language. In the case of the character '好', both '女' (girl), and '子' (child) are root-radical characters. But, since only one radical can be the root-radical and the left side radical '女' (girl) is defined as a root-radical, and the right side '子' is defined as the non-root radical. It is, therefore, possible to mistakenly write '泡' (bubble) as '炮' (cannon) in a phrase such as '如法 泡製' (follow the same method), since both have the same non-root radical character '包'. There are two variants of the Chinese writing system: simplified Chinese is used in China and traditional Chinese is used in Taiwan. Most of the characters used in both languages are identical, but some characters that have the same meaning are written differently and, hence, have different radicals. For instance, the simplified Chinese character '并' corresponds to two different traditional Chinese characters '並' (and) and '倂' (combine). The meaning of the character '并' in simplified Chinese must then be determined from the context of a phrase.

(B) Pronunciation: Various phonetic systems have been invented to record and teach the pronunciation of Chinese characters. In simplified Chinese, the phonetic system used is called 'pinyin'; and, in traditional Chinese, the phonetic system used is called 'BoPoMoFo' or BPMF. Different characters may be pronounced identically. For instance, in Japanese Kanji, both 確率 (probability), and 確立 (to formalize) are pronounced as kakuritsu, but the second characters are different. This is one possible cause of misspelling. Another possible cause of misspelling or misuse a character in a Chinese phrase is the similarity in phonetics between two characters. Consider in Chinese pinyin, 'fa' and 'hua' sound similar (or relatively similar), so some people may mistakenly write '發揮' (fā fēi, to display) as '花揮' (huā fēi), which is meaningless. In addition, some Chinese characters may have more than one pronunciation, depending on where the character is used in a phrase. For instance, in Chinese, '吃' is pronounced as 'chī' as in '吃飯' (eat a meal), and 'jī' as in '口吃' (stutter). So, a user may misspell '口吃' as '口及', which has the same pronunciation as stutter ('口吃') but is meaningless as a phrase.

So, it is conceivable that, in writing a Chinese phrase, a user may misuse a character due to misunderstanding radical or pronunciation attributes. A user may mistakenly write a Chinese character in place of another Chinese character that looks similar except that the radicals are not exactly the same. It is also possible that a user may write a Chinese character having a completely different meaning in a phrase. So, to solve the misuse problem in a Chinese phrase, it is insufficient to rely on a single detection method alone (e.g., pinyin or radical). It is necessary to examine all the possible causes of a mistake to correct the misused character in a phrase.

In general, spell checking for a language consists of two major functions: first, the identification of the incorrect letter/character in a word/phrase and second, the correction of the incorrect letters/characters, if possible. When correcting spelling problems, a Roman-based language such as English corrects the alphabetic letters associated with a word, whereas a non-Roman language such as Chinese corrects the characters associated with a phrase.

In comparing the phrases to identify a mismatched character, the edit distance is commonly used in Computer Science. In Roman languages such as English, the edit distance is defined as the number of different letters between two words. The comparison is performed at the letter level. If the edit distance is 0, two words are identical. If the edit distance is 1, there is one alphabetic letter different between two words, and if the edit distance is 2, there are two alphabetic letters different between two words. If the edit distance is greater than 2, then two words are most likely different, and it is either impossible or not worthwhile to correct the spelling error. Once the edit distance is computed, one can then attempt to correct the incorrect letters in a word by comparing them with the corresponding letters in the same position of a correct word.

SUMMARY OF THE INVENTION

A primary objective of the present invention is to provide a system and a method for checking a Chinese input phrase and automatically correcting mismatched characters in the input phrase.

A system for checking a Chinese input phrase and automatically correcting mismatched characters in the input phrase according to the present invention comprises a computer or device, a database, a mismatched character detection module, a mismatched character correction module and an inter-module communication channel. The database that contains correctly spelled Chinese phrases along with Chinese characters and their associated attributes such as pronunciation and radical composition is created for comparison with the Chinese input phrases. The mismatched character detection module detects possible character spelling or mismatch errors by comparing the Chinese input phrase with the database phrases. The mismatched character correction module corrects the mismatched characters in the input phrase as identified by the mismatched character detection module with a list of partially matched phrases retrieved from the database.

A method for checking a Chinese input phrase and automatically correcting mismatched characters in the input phrase according to the present invention comprises the steps of inputting an input phrase; determining if there is an exact match between the input phrase and Chinese phrases stored in a database; if there is no exact match, determining it is an unknown phrase or sending to an mismatched character correction module; performing an adjacency match, a pronunciation match and a radical match; and correcting the mismatched characters.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE INVENTION

The present invention comprises a system and a method for checking a Chinese input phrase and automatically correcting mismatched characters in the input phrase. The system includes a computer or a device, a database, and software modules. The computer or device can be a personal computer (PC), a web server, a laptop, a tablet PC, a smart phone, etc. In addition, the present invention can be applied in a networked configuration where the Chinese phrase is digitized and transported over a data network such as the Internet to the system. The input phrase is a sequence of digitized Chinese characters (at least two characters) that can be sent from various data input devices to the computer or device. The input phrases may be originated from, but are not limited to, a keyboard, a personal computer (PC), a laptop, a tablet PC, or a smart phone. The Chinese input phrase may be encoded in a binary data format and then transmit the binary message over a data network to the Chinese spell checking system.

Figure 1:
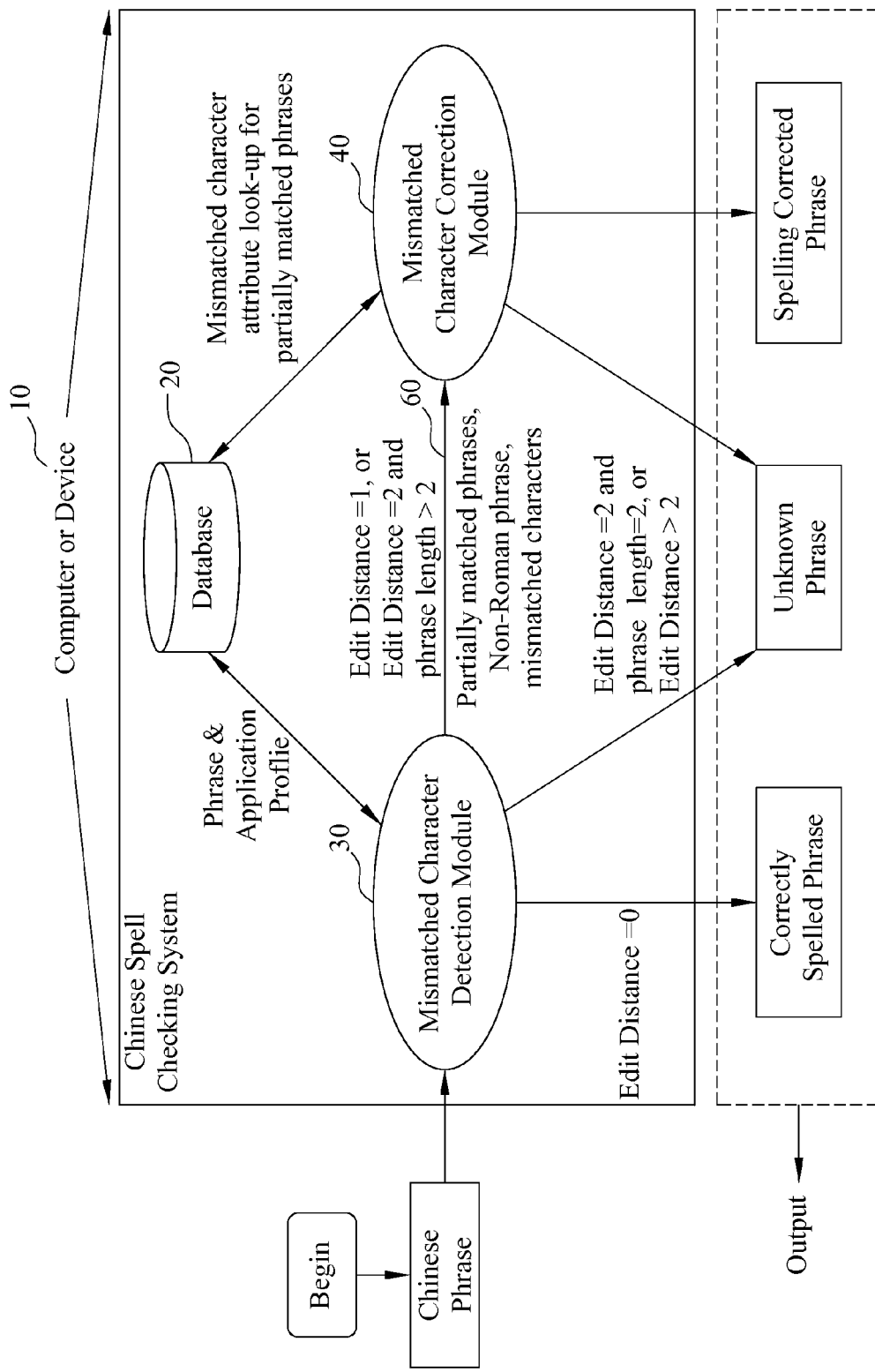
FIG. 1 is a schematic diagram illustrating a Chinese spell checking system according to an embodiment of the present invention.

FIG. 1 shows the system for checking a Chinese input phrase and automatically correcting mismatched characters in the input phrase according to the present invention. The system comprises a computer or device 10, a database 20, a mismatched character detection module 30, a mismatched character correction module 40 and an inter-module communication channel 60.

The computer or device 10 is equipped with a central processing unit (CPU), a non-volatile storage, a random access memory (RAM) and an optional data network interface card for the purpose of running the spell checking software.

The database 20 and setup files reside in the nonvolatile storage. The database and setup files are configured to include a plurality of correct Chinese phrases, characters and their associated attributes such as pronunciations and radical compositions. In the case of simplified Chinese, the pronunciation is called 'pinyin', and in the case of traditional Chinese, the pronunciation is called 'BoPoMoFo'. The database also contains application profiles for storing application-specific words that should be ignored during spelling checking.

Figure 2:
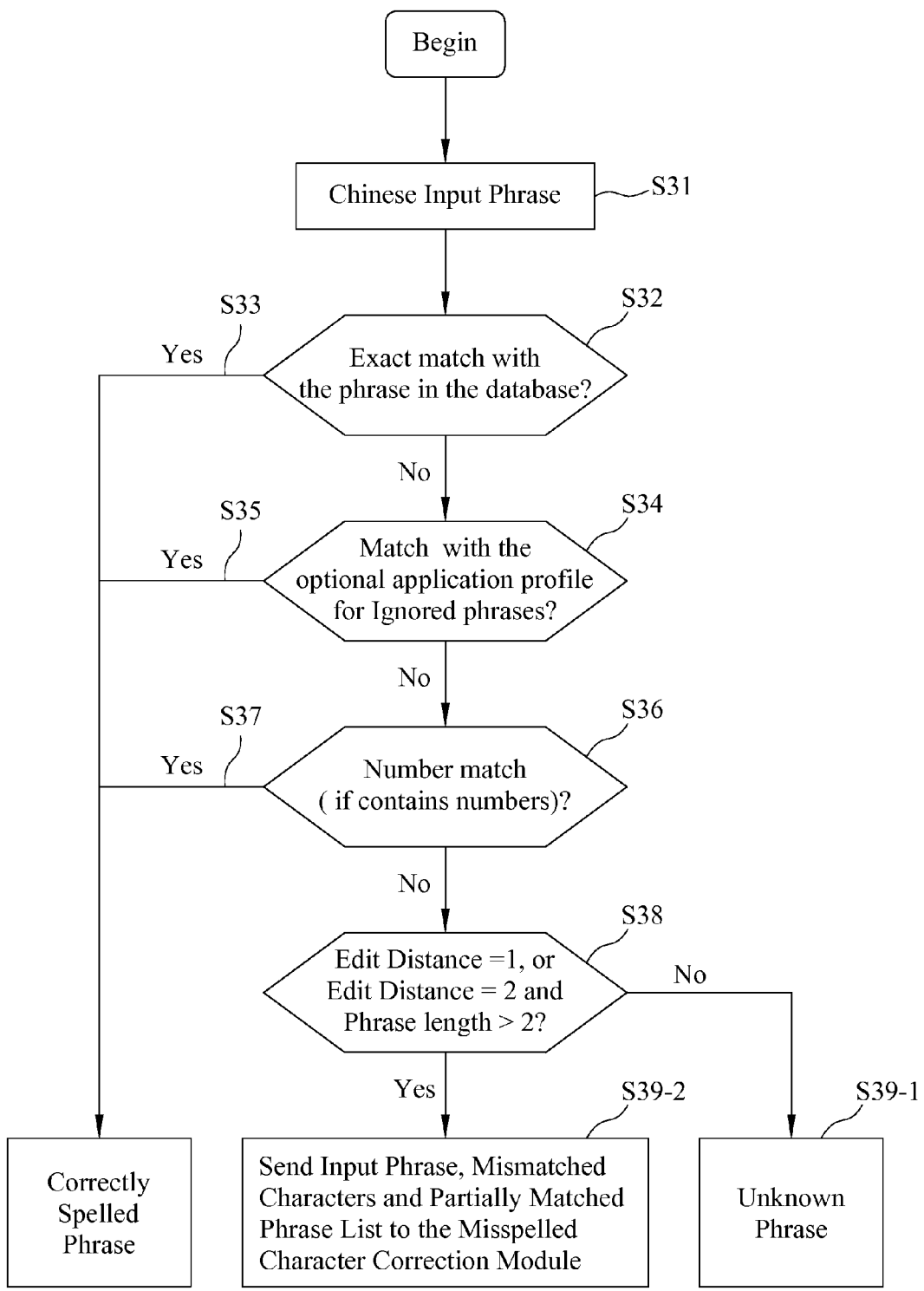
FIG. 2 is a flowchart illustrating a method for detecting mismatched characters in a Chinese phrase and generating a list of partially matched phrases retrieved from the database as its output.

The mismatched character detection module 30 takes the Chinese phrase as input, and compares the input phrase with the database phrases to detect if a phrase has mismatched characters. FIG. 2 shows the steps taken by the mismatched character detection module 30 to detect whether mismatched characters are present in the input phrase.

In Chinese, non-Arabic numeral characters are used instead of, or in addition to, Arabic numerals. For instance, ' 百五十 ' means '150' in Chinese. It is common to use either Arabic numbers or Chinese numbers in a phrase, and people understand what the numbers mean. So, in comparing phrases, it is necessary to convert the numbers from the Chinese characters to the Arabic numbers before comparison. If there is a match between the input phrase and the phrases in the database after the number conversion, the input phrase is correctly constructed.

If the input phrase can be found in the database (i.e., the edit distance is 0), the input phrase is correctly constructed.

If the edit distance is greater than 2, the input phrase is unknown. If the edit distance is equal to 2 and the phrase length is 2, the input phrase is also unknown.

If the edit distance is 1, there is a possible partial match between the input phrase and the phrase retrieved from the database. If the edit distance is equal to 2 and the phrase length is greater than 2, there is a possible partial match between the input phrase and the phrase retrieved from the database.

The partially matched phrase will be added to construct a list of partially matched phrases. It should be noted that not every partially matched input phrase is mismatched. For instance, an optional application-specific profile can be created in the database to store special phrases for different applications such that, if the phrases are contained in the application-specific profile, it is ignored by the mismatched character detection module 30 and is assumed to be correctly constructed.

Figure 3:
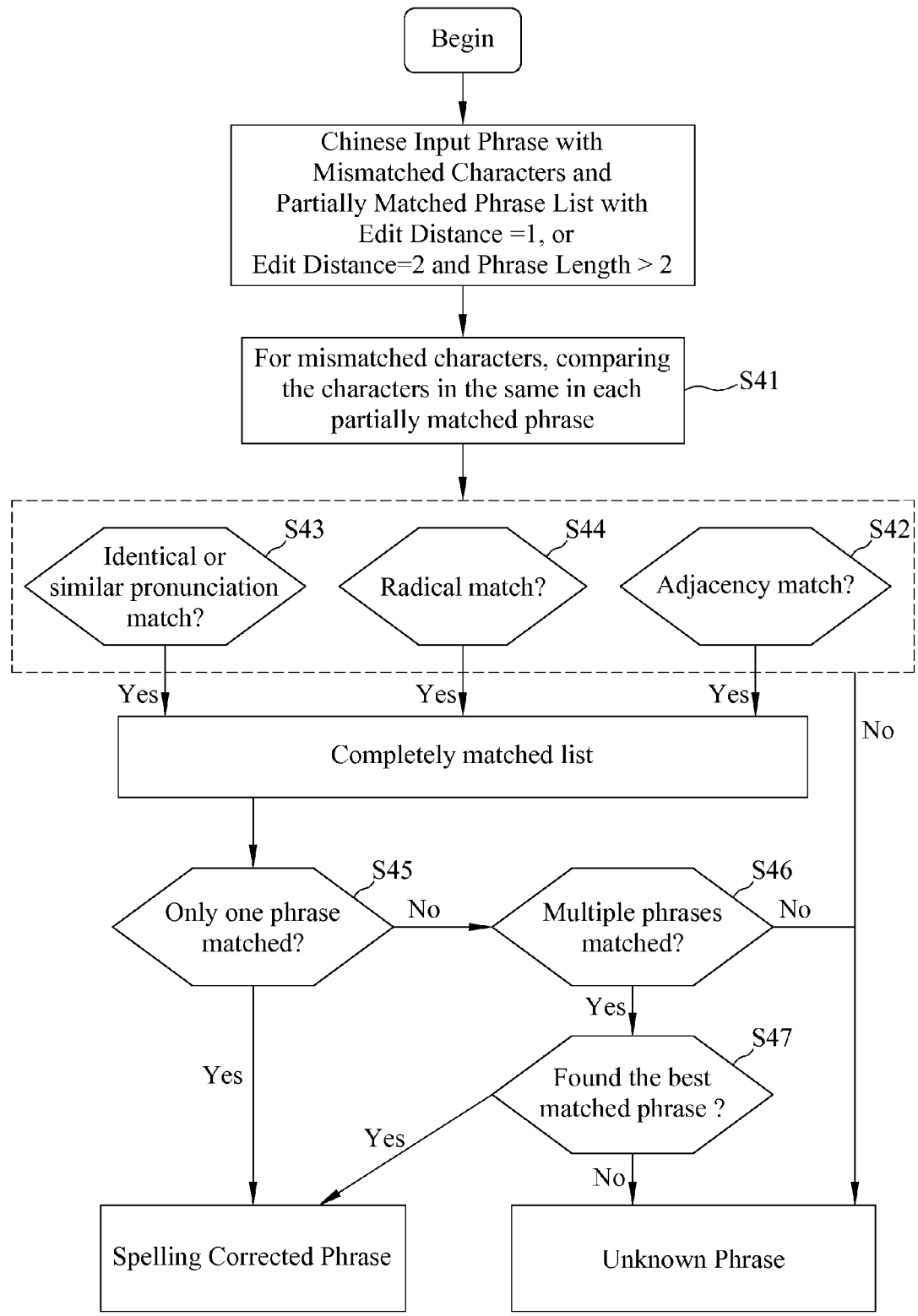
FIG. 3 is a flowchart illustrating a method for correcting mismatched character error by a mismatched character correction module.

The mismatched character correction module 40 takes input data structures passed from the mismatched character detection module 30 through the inter-module communication channel 60 and attempts to correct the mismatched characters. The input data structures include a list of partially matched phrases whose edit distance are less than or equal to two, mismatched characters and their associated pronunciation and radical compositions. FIG. 3 shows the steps taken by the mismatched character correction module 40 to correct mismatched characters in the input phrase.

For each partially matched phrase, the mismatched character correction module 40 will retrieve the pronunciation and radical compositions from the database 20 for the mismatched characters and compare their pronunciations and radical compositions with that of the mismatched characters in the input phrase to determine which partially matched phrase best matches the input phrase. The output of the mismatched character correction module 40 is a spelling corrected phrase or an unknown phrase.

Typically, the pronunciation of a non-Roman language consists of both phonetics and intonation (tone). In Chinese, a character has five possible intonations. When the intonation is different, the character tends to be different in meaning. So, in correcting the spelling error, in addition to comparing the phonetics, it is necessary to compare the intonations to determine if a character is misspelled or misused due to the same pronunciation.

The pronunciation comparison is performed only if there is not a complete match of the input phrase to the phrase stored in the database 20. In particular, the comparison is performed when the character edit distance of a Chinese phrase is 1 or the edit distance is 2 and the phrase length is greater than 2. If the edit distance is 2 and the phrase length is 2, the phrase is too short to perform the error correction. Similarly, if the edit distance is greater than two, the phrase is discarded, as well.

The result of the pronunciation comparison can be one of the following:

(1) identical pronunciation match, if characters with the same pronunciation as the mismatched characters can be found in another database phrase;

(2) similar pronunciation match, if characters with similar pronunciation as the mismatched characters can be found in another database phrase; and (3) no pronunciation match.

To perform a pronunciation match, a mapping of each Chinese character to its pronunciation element needs to be created in the database. For simplified Chinese, a pinyin string needs to be mapped to each simplified Chinese character in the database. For traditional Chinese, a pinyin string or a BPMF string needs to be mapped to each traditional Chinese character in the database.

Chinese characters are formed by root radicals and/or non-root radicals. For instance, in Chinese, both '女' (girl) and '子' (child) are root-radicals and characters. Root radicals may or may not have meanings, depending on whether they are characters or not. It is possible to combine two root-radicals such as '女' and '子' to form a different character such as '好' (good). It is also possible to add a non-radical such as '古' (ancient) to a root-radical such as '女' to form another character such as '姑' (aunt). Note that the non-radical character '古' itself is composed of two radicals: '十' (10, non-root radical), and '口' (mouth, root radical). There are 214 root radicals that are used as classifiers for Chinese characters.

The following is the method for comparing the radicals of two Chinese characters:

(1) Two characters are said to be an exact match if, and only if, both root-radical and non-root-radical are identical.

(2) Two characters are said to be a root-radical match if, and only if, their root-radicals are the same, but their non-root radicals are not the same. For instance, '好' (good) and '姑' (aunt) are considered to have the identical root radical '女' (girl).

(3) Two characters are said to be a non-root radical match if, and only if, the root radicals are different, but their non-root radicals are identical. For instance, '躬' (bow) and '拘' (to grasp) are considered to have the identical non-root radical '句'.

(4) Two characters are said to be a partial non-root radical match if, and only if, a portion of the non-root radicals are different, but a portion of the non-root radicals is also identical.

(5) Two characters are said to be a radical mismatch if neither the root radical nor the non-root radical is identical or partially identical.

An adjacency match is performed by swapping two adjacent and mismatched characters in the input phrase and see if the input phrase would match any of the partially matched phrases. If a match is found, the mismatched character correction module 40 adds the partially matched phrase to a completely matched phrase list. When the mismatched characters in an input phrase find a match with a partially matched list through the adjacency match, the pronunciation and similar pronunciation match or the radical match, the partially matched phrase is added to the completely matched list. If the mismatched characters in an input phrase cannot find any match with those of the partially matched phrases, the input phrase is unknown. If, after comparing the input phrase with a list of partially matched phrases, there is only a single matched phrase in the completely matched phrase list, the corrected input phrase has been found. However, if the completely matched list contains multiple phrases, the following methods are used in descending order to pick the best-matched phrase from the completely matched phrase list:

(1) If only one of the completely matched phrases contains the adjacency match, the best-matched phrase is found.

(2) If only one of the completely matched phrases has an identical pronunciation match, the best-matched phrase is found.

(3) If only one of the completely matched phrases has both similar pronunciation and radical matches, the best-matched phrase is found.

(4) If only one of the completely matched phrases has a similar pronunciation match, the best-matched phrase is found.

(5) If only one of the completely matched phrases has a radical match, the best-matched phrase is found.

(6) If the best phrase can't be found from the completely matched phrase list, there is no best-matched phrase.

To perform the above comparison, it is necessary to build a radical database that encompasses both simplified Chinese and traditional Chinese languages.

It should be noted that the division of the modules 30 and 40 is based on functionality and run-time efficiency. The two modules 30 and 40 can be combined to form one module if necessary. Some of the detection functionality in the mismatched character detection module may be moved to or reused by the mismatched character correction module to avoid duplication in software code.

The inter-module communication channel 60 is provided between the mismatched character detection module 30 and the mismatched character correction module 40. The partially matched phrases, mismatched characters and the pronunciations and the radical compositions of the characters are sent from the mismatched character detection module 30 to the mismatched character correction module 40 through the inter-module communication channel 60. The pronunciation and the radical composition are used for facilitating spell checking by the system at run time. The system software will read the non-volatile storage during start-up or run-time to compare the phrases and the attributes of each character in the phrase. The inter-module communication channel 60 can be created using data files, random access memory (RAM) or the database.

Although the invention is about the Chinese spell checking system, the same concept may also be applied to other non-Roman languages such as Japanese and Korean, which also contain pronunciations and radicals for their respective character sets.

FIGS. 2 and 3 show the steps performed by the mismatched character detection module 30 and the mismatched character correction module 40, respectively. A method for detecting and correcting mismatched Chinese characters in a phrase, the method comprising the steps of:

(S31): inputting an input phrase;

(S32): the mismatched character detection module 30 comparing the input phrase with Chinese phrases stored in the database 20;

(S33): in the step (S32), if there is an exact match, the mismatched character detection module 30 determining the input phrase as constructed correctly;

(S34): in the step (S32), if there is no exact match, the mismatched character detection module 30 checking if there is any match with the optional application profile for ignored phases;

(S35): in the step (S34), if there is a match, the mismatched character detection module 30 determining the input phrase as constructed correctly;

(S36): in the step (S34), if there is no match with the application profile, the mismatched character detection module 30 checking if there is any number match, (S37): in the step (S36), if there is a number match, the mismatched character detection module 30 determining the input phrase as constructed correctly;

(S38): in the step (S36), if there is no number match, the mismatched character detection module 30 comparing the input phrase with the database phrases to determine the edit distance and the phrase length;

(S39-1): in the step (S38), (1) if the edit distance is greater than two, the mismatched character detection module 30 determining the input phrase as an unknown phrase; (2) if the edit distance is two and the phrase length is two, the mismatched character detection module determining the input phrase as an unknown phrase;

(S39-2): in the step (S38), if the edit distance is one, or the edit distance is two and the phrase length is greater than two, the mismatched character detection module looking up a database to retrieve the associated pronunciation and radical composition for each of the mismatched Chinese characters in the input phrase and sending the retrieved information to the mismatched character correction module 40;

(S41): the mismatched character correction module 40 comparing the mismatch characters with the characters in the same position in each partially matched phrase;

(S42): in the step (S41), the mismatched character correction module 40 performing an adjacency match by swapping two adjacent and mismatched characters in the input phrase and see if the input phrase would match any of the partially matched phrases, if a match being found, the mismatched character correction module 40 adding the partially matched phrase to a completely matched phrase list;

(S43): in the step (S41), the mismatched character correction module 40 comparing the pronunciation of the mismatched character(s) with that of the character(s) in the same position of the partially matched phrase, if the pronunciation is identical, the mismatched character correction module 40 adding the partially matched phrase to the completely matched phrase list; the mismatched character correction module comparing the pronunciation of the mismatched character(s) with that of the character(s) in the same position of the partially matched phrase, if the pronunciation is similar, the mismatched character correction module 40 adding the partially matched phrase to the completely matched phrase list;

(S44): in the step (S41), the mismatched character correction module 40 comparing the radical composition of the mismatched character(s) with that of the character(s) in the same position of the partially matched phrase, if there is a radical match, the mismatched character correction module 40 adding the partially matched phrase to the completely matched phrase list;

(S45): determining if there is only one phrase matched, if there is only one phrase matched, the mismatched character correction module 40 correcting the mismatched character(s);

(S46): determining if there are multiple phrases matched, if there is no multiple phrases matched, the mismatched character correction module 40 determining the input phrase as an unknown phrase; and (S47): in step (S46), if there are multiple phrases matched and a best matched phrase is found, the mismatched character correction module 40 correcting the mismatched character(s); if there are multiple phrases matched and no best matched phrase is found, the mismatched character correction module 40 determining the input phrase as an unknown phrase.

The best-matched phrase can be found through the following steps performed in the descending order:

(1) if only one of the completely matched phrases contains the adjacency match, the best-matched phrase is found;

(2) if only one of the completely matched phrases has an identical pronunciation match, the best-matched phrase is found;

(3) if only one of the completely matched phrases has both similar pronunciation and radical matches, the best-matched phrase is found;

(4) if only one of the completely matched phrases has a similar pronunciation match, the best-matched phrase is found; and (5) if only one of the completely matched phrases has a radical match, the best-matched phrase is found.

The following are some of the applications of the invention. The invention is not limited to the following applications:

(1) Documentation spell checking which Corrects misspelled Chinese phrases in digital data files such as e-books, e-journals, newspapers, theses, and dissertations.

(2) Detecting misspelled Chinese phrases and suggesting corrected phrases or automatically correcting misspelled Chinese phrases in word processing software by providing a software plug-in for the word processing software.

(3) Detecting misspelled Chinese phrases and suggesting corrected phrases or automatically correcting misspelled Chinese phrases in a Web page by providing a software plug-in for a Web browser.

(4) Detecting misspelled Chinese phrases and suggesting corrected phrases or automatically correcting misspelled Chinese phrases in a computer graphical user interface (GUI) such as an e-mail client by providing a software application programming interface (API) from the speller checker software.

(5) Improving returned data set of a search engine by preprocessing the input phrase and passing both correctly and incorrectly spelled phrases to the search engine. This will result in more data to be returned. For instance, if one enters the misspelled Chinese phrase '一踢糊塗' (a complete mess, the second character was misspelled), the search engine will return a different set of web pages from the correctly spelled phrase '一塌糊涂'. If the invention system is used to process the misspelled input phrase '一塌糊涂', it will then detect the mismatched character and find the correct phrase. Two queries ('一蹋糊涂' and '一塌糊涂') can then be sent on behalf of the requester to the search engine, and their respective outputs can be combined to return to the requester.

(6) Improving accuracy in a dictionary look-up software program by correcting misspelled input phrases, before passing them to the dictionary look-up function.

(7) Improving accuracy of automatic language translation from a Chinese language to another language by correcting the misspelled phrases before the translation takes place.

Although the present invention has been described with reference to the preferred embodiment thereof, it is apparent to those skilled in the art that a variety of modifications and changes may be made without departing from the scope of the present invention, which is intended to be defined by the appended claim.

What is claimed is:

1. A non-transitory computer-readable medium on which is stored a computer program for detecting and correcting mismatched Chinese characters in a phrase, the computer program comprising computer instructions that when executed by a computing device performs the steps of:

(S1) inputting an input phrase;

(S2) a mismatched character detection module comparing the input phrase with Chinese phrases stored in a database;

(S3) in step (S2), if there is an exact match, the mismatched character detection module determining the input phrase as constructed correctly;

(S4) in step (S2), if there is no exact match and an edit distance is greater than two, the mismatched character detection module determining the input phrase as an unknown phrase;

(S5) in step (S2), if there is no exact match, the edit distance is two and the phrase length is two, the mismatched character detection module determining the input phrase as an unknown phrase;

(S6) in step (S2), if there is no exact match, the edit distance is one, or the edit distance is two and the phrase length is greater than two, the mismatched character detection module looking up a database to retrieve the associated pronunciation and radical composition for each of the mismatched Chinese characters in the input phrase and sending the retrieved information to an mismatched character correction module;

(S7) the mismatched character correction module performing an adjacency match by swapping two adjacent and mismatched characters in the input phrase and see if the input phrase would match any of the partially matched phrases, if a match being found, the mismatched character correction module adding the partially matched phrase to a completely matched phrase list;

(S8) the mismatched character correction module comparing the pronunciation of the mismatched character(s) with that of the character(s) in the same position of the partially matched phrase, if the pronunciation is identical, the mismatched character correction module adding the partially matched phrase to the completely matched phrase list;

(S9) the mismatched character correction module comparing the pronunciation of the mismatched character(s) with that of the character(s) in the same position of the partially matched phrase, if the pronunciation is similar, the mismatched character correction module adding the partially matched phrase to the completely matched phrase list;

(S10) the mismatched character correction module compare the radical composition of the mismatched character(s) with that of the character(s) in the same position of the partially matched phrase, if there is a radical match, the mismatched character correction module adding the partially matched phrase to the completely matched phrase list.

2. The non-transitory computer-readable medium as claimed in claim 1, wherein the edit distance is used as a measurement by the mismatched character detection module to determine if there are mismatched characters.

3. The non-transitory computer-readable medium as claimed in claim 1, wherein if the edit distance is equal to one or two but the phrase length is greater than two, the mismatched character detection module performs a database look up to retrieve the pronunciation and radical composition for the characters mismatched.

4. The non-transitory computer-readable medium as claimed in claim 1, wherein the mismatched character detection module sends to the mismatched character correction module the mismatched characters, pronunciations and radical composition of the characters, and a list of partially matched phrases that have the edit distance equal to or less than two for correcting mismatched characters.

5. The non-transitory computer-readable medium as claimed in claim 1, wherein the mismatched characters can be corrected if there is only one phrase in the completely matched phrase list.

6. The non-transitory computer-readable medium as claimed in claim 1, wherein the mismatched characters can be corrected if there are multiple phrases in the completely matched phrase list and a best matched phrase can be found through the following steps performed in descending order:

if only one of the completely matched phrases contains the adjacency match, the best-matched phrase is found;

if only one of the completely matched phrases has an identical pronunciation match, the best-matched phrase is found;

if only one of the completely matched phrases has both similar pronunciation and radical matches, the best-matched phrase is found;

if only one of the completely matched phrases has a similar pronunciation match, the best-matched phrase is found; and if only one of the completely matched phrases has a radical match, the best-matched phrase is found.

* * * * *